United States Patent [19]

Reitz et al.

[11] 4,137,385
[45] Jan. 30, 1979

[54] HYDROCURABLE COMPOSITIONS CONTAINING POLY-OXAZOLINE GROUPS

[75] Inventors: R. Larry Reitz, Salem, Conn.; Thomas W. Hutton, Doylestown; Sheldon N. Lewis, Willow Grove, both of Pa.

[73] Assignee: Rohm and Haas Company, Philadelphia, Pa.

[21] Appl. No.: 809,887

[22] Filed: Jun. 24, 1977

[51] Int. Cl.$^2$ .............................................. C08F 8/30
[52] U.S. Cl. ...................................... 526/50; 526/15; 526/53
[58] Field of Search ........................... 526/50, 15, 53

[56] References Cited
U.S. PATENT DOCUMENTS

| 3,543,602 | 2/1951 | Rowland | 526/15 |
| 3,752,793 | 8/1973 | Arlt et al. | 526/15 |
| 3,758,629 | 9/1973 | Thill | 526/50 |
| 3,935,138 | 1/1976 | Wingler et al. | 526/50 |

Primary Examiner—William F. Hamrock
Attorney, Agent, or Firm—Lester E. Johnson

[57] ABSTRACT

Disclosed herein are novel hydrocurable, thermoset polymers comprising the reaction product of
(A) a first poly-oxazoline compound represented by the formula

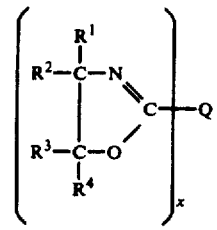

wherein:
(1) Q is a sigma bond or a divalent or trivalent organic radical having up to 60 carbon atoms which is a member of (a) the saturated straight-chain, branched-chain, and mono- and dicyclic aliphatic hydrocarbon group, or (b) the mono- and dicyclic aromatic hydrocarbon group, or (c) the group which comprises a combination of (a) and (b) above, wherein each of said radicals occurs, independently, as a substituent attached to a different carbon atom or to a single carbon atom of the hydrocarbon group of (a) or (b) above;
(2) x is an integer having a value of from two to twenty, wherein when Q is a sigma bond x has a value of two; and
(3) $R^1$, $R^2$, $R^3$ and $R^4$ are independently selected from the group of hydrogen and monovalent organic radicals which contain from one to twenty carbon atoms and which are unreactive towards carboxylic acid cyclic anhydrides;
(B) a second compound comprising a polymer containing in the backbone thereof a plurality of units derived from addition polymerizable ethylenically unsaturated dicarboxylic acid cyclic anhydrides; and
(C) water;

the ratio of poly-oxazoline groups of said first compound, A, to cyclic anhydride groups of said second compound, B, being about 1:1. The polymers of this invention are useful as ripple-free, smooth coatings.

15 Claims, No Drawings

HYDROCURABLE COMPOSITIONS CONTAINING POLY-OXAZOLINE GROUPS

BACKGROUND OF THE INVENTION

A. Field of the Invention

This invention relates to poly-oxazoline-containing composition suitable for use as coatings. More particularly, it relates to a hydrocured, thermoset composition of the reaction product of a first poly-oxazoline compound, a second compound which is a polymer containing units derived from carboxylic acid cyclic anhydrides, and water; and to the use thereof as a coating on a substrate. The hydrocured, thermoset polymers are obtained by blending a poly-oxazoline compound with a polymer containing in the backbone thereof a plurality of units derived from addition polymerizable ethylenically unsaturated dicarboxylic acid cyclic anhydrides, heating the blend so as to obtain a fused blend, and crosslinking the fused blend to obtain the thermoset polymer by exposing the fused blend to moisture. The hydrocured, thermoset polymer is obtained as a ripple-free, smooth coating by applying the blended materials, preferably as a powder, to a suitable substrate prior to fusing the blend and then exposing the fused blend to moisture.

B. Description of the Prior Art

Durable and inexpensive thermoset polymers, useful as coatings, are in continual commerical demand. Of these thermoset polymers, especially those which are suitable for use in powder form are of particular interest today in light of their ability to be applied by electrostatic spary processes thereby obviating the use of noxious solvents.

Bis-oxazolines and the preparation thereof are well known in the art. (See U.S. Pat. Nos. 2,569,428; 3,208,981; 3,419,520.)

Poly-oxazolines and the preparation thereof by polymerizing 2-alkenyl oxazolines are also well known in the art. (See U.S. Pat. Nos. 2,831,858; 2,897,182; 3,535,291.)

The reaction of blends bis-oxazolines with dicarboxylic acid cyclic anhydrides and polymeric dicarboxylic acid cyclic anhydrides, in the absence of water, to form imido-ester compounds, some of which are useful as coatings, is known. (See U.S. Pat. Nos. 2,547,495; 2,547,496; 2,547,498; 2,543,602.)

Also, the reaction of blends of copolymers containing units from ethylenically unsaturated mono- and dicarboxylic acids with bis-oxazolines, in the absense of water, to provide coating materials is known. (U.S. Pat. No. 3,752,793.)

However, the known powdered polymers yet have undesirable problems associated with their use, chief among which is the problem known in the art as "orange peel." This defect occurs as a result of the competition during "stoving" (or "baking") between the flow of the polymer coating material on its substrate and the concurrent cure of the polymer which causes a surface rippling effect, or "orange peel." It has been conceived and demonstrated herein that this problem is overcome when the polymers of the invention are first heated at a temperature sufficient to provide desirable flow and then subsequently cured by further heating the resulting flowed material in the presence of moisture.

SUMMARY OF THE INVENTION

It is an object of this invention to provide a hydrocurable, thermosettable polymer blend suitable to be adapted as a powdered coating material.

Another object of this invention is to provide a hydrocured, thermoset polymer composition suitable to be adapted as a ripple-free, smooth coating.

A still further object of this invention is to provide, as an article of manufacture, a substrate containing on a surface thereof the hydrocured thermoset polymer of the invention.

These objects, and others as will become apparent, are achieved by this invention which comprises a hydrocurable, thermosettable blend comprising:

(A) a first poly-oxazoline compound represented by the formula

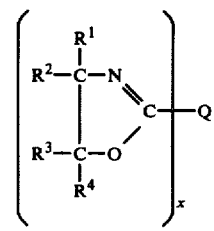

wherein:
(1) Q is a sigma bond or a divalent or trivalent organic radical having up to sixty carbon atoms which is a member of (a) the saturated straight-chain, branched-chain, and mono- and dicyclic aliphatic hydrocarbon group, or (b) the mono- and dicyclic aromatic hydrocarbon group, or (c) the group which comprises a combination of (a) and (b) above, wherein each of said radicals occurs, independently, as a substituent attached to a different carbon atom or to a single carbon atom of the hydrocarbon groups of (a) and (b) above;
(2) $x$ is an integer having a value of from two to twenty, wherein when Q is a sigma bond $x$ has a value of two; and
(3) $R^1$, $R^2$, $R^3$ and $R^4$ are independently selected from the group of hydrogen and monovalent organic radicals which contain from one to twenty carbon atoms and which are unreactive towards carboxylic acid cyclic anhydrides; and (B) a second compound comprising a polymer containing in the backbone thereof a plurality of units derived from addition polymerizable ethylenically unsaturated dicarboxylic acid cyclic anhydrides; the ratio of poly-oxazoline groups of said first compound, A, to cyclic anhydride groups of said second compound, B, being about 1:1.

In another aspect, this invention comprises a hydrocured, thermoset polymer comprising the reaction product of:

(A) a first poly-oxazoline compound represented by the formula

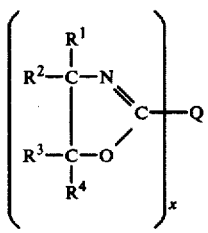

wherein:
(1) Q is a sigma bond or a divalent or trivalent organic radical having up to 60 carbon atoms which is a member of (a) the saturated straight-chain, branched-chain, and mono- and dicyclic aliphatic hydrocarbon group, or (b) the mono- and dicyclic aromatic hydrocarbon group, or (c) the group which comprises a combination of (a) and (b) above, wherein each of said radicals occurs, independently, as a substituent attached to a different carbon atom or to a single carbon atom of the hydrocarbon groups of (a) and (b) above;

(2) $x$ is an integer having a value of from two to twenty, wherein when Q is a sigma bond $x$ has a value of two; and (3) $R^1$, $R^2$, $R^3$ and $R^4$ are independently selected from the group of hydrocarbon and monovalent organic radicals which contain from one to twenty carbon atoms and which are unreactive towards carboxylic acid cyclic anhydrides; and (B) a second compound comprising a polymer containing in the backbone thereof a plurality of units derived from addition polymerizable ethylenically unsaturated dicarboxylic acid cyclic anhydrides; and (C) water; the ratio of poly-oxazoline groups of said first compound, A, to cyclic anhydride groups of said second compound, B, being about 1:1.

In a further aspect, this invention comprises a method of making a hydrocured thermoset polymer comprising the steps of blending (A) a first poly-oxazoline compound represented by the formula

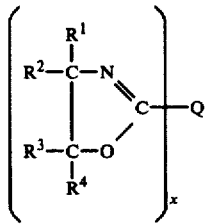

wherein:
(1) Q is a sigma bond or divalent or trivalent organic radical having up to sixty carbon atoms which is a member of (a) the saturated straight-chain, branched-chain, and mono- and dicyclic aliphatic hydrocarbon group, or (b) the mono- and dicyclic aromatic hydrocarbon group, or (c) the group which comprises a combination of (a) and (b) above, wherein each of said radicals occurs, independently, as a substituent attached to a different carbon atom or to a single carbon atom of the hydrocarbon groups of (a) and (b) above;

(2) $x$ is an integer having a value of from two to twenty, wherein when Q is a sigma bond $x$ has a value of two; and (3) $R^1$, $R^2$, $R^3$ and $R^4$ are independently selected from the group of hydrogen and monovalent organic radicals which contain from one to twenty carbon atoms and which are unreactive towards carboxylic acid cyclic anhydrides; with (B) a second compound comprising a polymer containing in the backbone thereof a plurality of units derived from addition polymerizable ethylenically unsaturated dicarboxylic acid cyclic anhydrides;

the ratio of poly-oxazoline groups of said first compound to cyclic anhydride groups of said second compound being about 1:1 heating the blended compounds to a temperature of from about 100° C. to about 250° C. thereby fusing the blended compounds; and curing said fused blend by exposing the fused blend to moisture.

In still another aspect, this invention comprises an article of manufacture comprising a substrate containing on a surface thereof the hydrocured thermoset polymer of this invention.

In still a further aspect, this invention comprises a method of making an article of manufacture comprising the steps of depositing the hydrocurable, thermosettable blend of this invention on a solid substrate, fusing said blend, and curing said fused blend by exposing it to moisture.

As stated hereinabove, the poly-oxazoline compounds used in this invention are known compounds. Preferably, the poly-oxazoline compounds are prepared by reacting a polybasic carboxylic acid with a 2-aminoalcohol under refluxing conditions so as to eliminate water as represented by the following equation

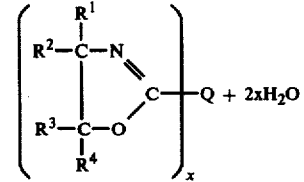

wherein Q, $x$, $R^1$, $R^2$, $R^3$ and $R^4$ are as defined hereinabove. Suitable divalent or trivalent radicals, represented hereinabove by the symbol Q, include the following:

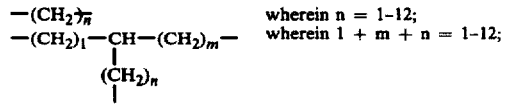

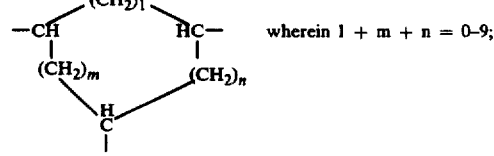

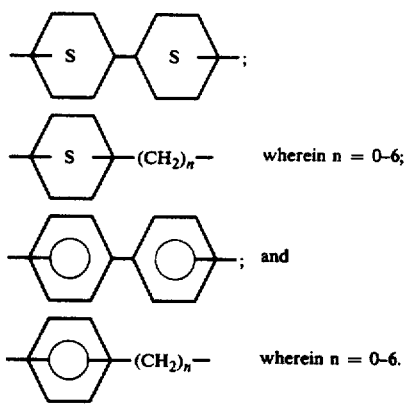

Dimer and trimer acids, that is high molecular weight dibasic and tribasic carboxylic acids resulting from the polymerization of two or three $C_{18}$ unsaturated fatty acid units at the double bond therein, are also suitable.

Additionally, low molecular weight polymers of unsaturated aliphatic mono- and dicarboxylic acids or lower alkyl esters thereof such as, for example, acrylic acid, methacrylic acid, 2-hexenoic acid, hexene-(2)-dicarboxylic acid, itaconic acid, glutaconic acid and the like. More preferably, the polybasic carboxylic acids used in this invention to prepare the poly-oxazoline compounds are those selected from the group of saturated aliphatic, straight-chain, $\alpha\omega$-dicarboxylic acids. Most preferably, the polybasic carboxylic acids used in this invention are $\alpha,\omega$-dicarboxylic acids having the formula

$$HOOC-(CH_2)_n-COOH$$

wherein $n = 4-8$, which give corresponding bis-oxazoline compounds.

As indicated hereinabove, suitable aminoalcohols useful in making the poly-oxazolines used in this invention are represented by the formula

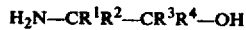
$$H_2N-CR^1R^2-CR^3R^4-OH$$

wherein $R^1$, $R^2$, $R^3$ and $R^4$ are independently selected from the group of hydrocarbon and monovalent organic radicals which contain from one to twenty carbon atoms and which are unreactive towards carboxylic acid cyclic anhydrides. The expression "organic radicals which contain from one to twenty carbon atoms and which are unreactive towards carboxylic acid cyclic anhydrides" is meant to exclude organic radicals containing substituents such as, for example, hydroxy and amino groups. Whether or not a particular substituent is reactive with acid anhydrides is well within the knowledge of one skilled in the art. More preferably, the aminoalcohols used in this invention to make the poly-oxazoline compounds are those selected from the group wherein $R^1$, $R^2$, $R^3$ and $R^4$ are independently selected from the group of hydrogen and lower alkyl groups of from one to five carbon atoms. Most preferably, the aminoalcohols used in this are those represented by the formula shown above wherein $R^1$ and $R^2$ are independently selected from the group of lower alkyl groups of from one to five carbon atoms and $R^3$ and $R^4$ are hydrogen.

Typical addition polymerizable ethylenically unsaturated dicarboxylic acid cyclic anhydrides useful in preparing the second compound comprising a polymer containing in the backbone thereof a plurality of units of cyclic anhydride groups, described hereinabove, are maleic anhydride, itaconic anhydride, glutaconic anhydride and the like. These anhydride-containing addition polymers are obtained by conventional methods. Also, the anhydride monomers may be copolymerized with other copolymerizable ethylenically unsaturated compounds which contain a vinyl group ($CH_2=CH-$), a vinylidene group ($CH_2=C$), or a vinylene group ($-CH=CH-$). Included among such compounds are $\alpha,\beta$-ethylenically unsaturated monocarboxylic acids and esters thereof, $\alpha,\beta$-ethylenically unsaturated aldehydes, $\alpha,\beta$-ethylenically unsaturated dicarboxylic acids and esters thereof, $\alpha,\beta$-ethylenically unsaturated nitriles, ethylenically unsaturated hydrocarbons including $\alpha$-olefins and conjugated diolefins and vinylaryl compounds, vinyl alkyl ethers, vinyl halides, vinylidene halides, vinyl sulfides, vinyl acyloxy compounds (that is, esters of saturated carboxylic acids and ethylenically unsaturated alcohols), and vinyl ureido monomers.

Specific examples of suitable monomers which may be copolymerized with the dicarboxylic acid cyclic anhydrides are esters and half esters of acrylic, methacrylic, itaconic, 4-pentenoic, and phthalic acids and the like with alkanols having from one to twenty carbon atoms such as, for example, methanol, ethanol, propanol, butanol, hexanol, dodecanol, pentadeconal and the like; acrolein and methacrolein; ethylene and propylene; butadiene, isoprene, and chloroprene; styrene and vinyltoluene; vinyl methyl ether; vinyl chloride; vinylidene chloride; vinyl sulfide; vinyl acetate; ureido monomers such as are disclosed in U.S. Pat. Nos. 2,881,155 to Hankins; 3,300,429 to Glavis and Keighly; and 3,356,627 to Scott, including $\beta$-ureidoethyl acrylate, $\beta$-(N,N'-ethylene ureido)-ethyl acid maleate, $\beta$-ureidoethyl vinyl ether, N-vinyl-N,N'-ethyleneurea, N-vinyloxyethyl-N,N'-ethyleneurea, N-methacrylamidomethyl-N,N'-ethyleneurea, and N-dimethylaminoethyl-N'-vinyl-N,N'-ethyleneurea; N-hydroxyethylacrylamide, N-methylol-acrylamide, and N,N-(dimethylaminoethyl) acrylamide and the like. Compounds containing two or more cyclic anhydride groups are also useful in minor amounts (that is, less than 50% by weight) in addition to the cyclic anhydride addition polymers. Examples of such cyclic anhydride compounds are 1,2,4,5,-benzenetetracarboxylic anhydride and the product of the reaction of maleic anhydride with drying oils such as, for example, linseed oil. The preferred comonomers are styrene and the ($C_1-C_4$) alkyl esters of acrylic and methacrylic acids.

The quantity of said cyclic anhydride units in the copolymer backbone is from about 2% to 70% on a weight basis, preferably from about 5% to 20%.

The hydrocurable, thermosettable blend of the invention may be provided as a powdered composition that does not contain a solvent, or a suitable inert solvent can be added to dissolve the first poly-oxazoline compound and the second dicarboxylic acid cyclic anhydride containing polymer, respectively, for formulating the blend. The solvent may then be removed to provide a powdered poly-oxazoline-polymer blend. Alternatively, the blend may be supplied as a solution or nonaqueous dispersion. Included among solvents which can be used are toluene, xylene, liquid aliphatic hydrocarbons, isopropyl ether, ethyl acetate, 2-ethoxy ethyl acetate, methyl ethyl ketone, and the like, as well as mixtures of such solvents.

Pigments, dyes, fillers, antioxidants and antiozonants, stabilizers, flow control agents, or other optional ingredients can also be included.

As indicated hereinabove, the hydrocurable, thermosettable blends of this invention are adapted to be applied from solution or from nonaqueous dispersions by any suitable means to a solid substrate such as, for example, by means of brushing, spraying, dipping roller-coating or by any other suitable method known in the art. Fusion of the coating is not necessary when the blend is applied from solution. It is especially preferred to provide the hydrocurable, thermosettable blend of this invention as a powder and to apply the powdered blend electrostatically or by other powder-spreading means to a solid substrate.

It unexpectedly and surprisingly has been discovered that the prior art problem of premature cure which resulted in surface-rippling may be eliminated by utilizing the hydrocurable, thermosettable blends of this invention in the selective process of this invention wherein the blend, applied to a surface of a substrate, is preliminarily heated under substantially anhydrous conditions to cause fusion of the particles whereby desirable melt and flow is achieved. Then, in a separate step, the fused blend is exposed to moisture to effect crosslinking of the blend as represented by the following equations:

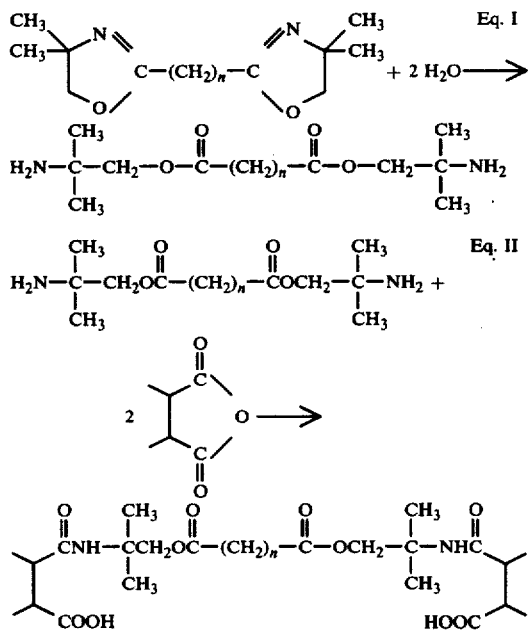

The selectivity in the process is made possible by the discovery that the hydrocurable, thermosettable blends of this invention may be prevented from crosslinking and curing if maintained under substantially anhydrous conditions at temperatures sufficiently high to render and maintain the blends as a fluid composition, which temperatures heretofore were sufficiently high to cause crosslinking of prior art coating compositions. Since the hydrolysis and crosslinking are not instantaneous, it is possible to obtain good flow and leveling prior to crosslinking simply by introducing the substrate containing a film of the fused blend applied to a surface thereof directly into a high humidity oven, resulting in an article having a smooth, ripple-free surface.

The rate of cure depends, in part, upon whether $R^1$ and $R^2$ are both hydrogen; one is hydrogen and the other alkyl; or both are alkyl. For example, when tetramethylene-2,2'-bis-5-methyl-2-oxazoline, wherein $R^1$, $R^2$ and $R^3$ are hydrogen and $R^4$ is methyl in the formula representing the poly-oxazolines shown hereinabove, is blended with a copolymer containing 15% maleic anhydride in amounts such that the mixture contains oxazoline groups and cyclic anhydride groups in a ratio of about 1:1, a solvent solution thereof gels in just less than three weeks and a film having a thickness of about 1 mil, which had been air dried for several days prior to curing, cures under ambient conditions in a matter of a few days. On the other hand, when tetramethylene-2,2'-bis-4,4-dimethyl-2-oxazoline, wherein $R^1$ and $R^2$ are methyl and $R^3$ and $R^4$ are hydrogen in the formula representing the poly-oxazolines shown hereinabove, is subjected to the same conditions as in the case of the aforementioned "5-methyl" bis-oxazoline compound, the solution does not gel nor does a film cure under ambient conditions over a period of several days. Accordingly, the 4,4-dialkyl bis-oxazoline compounds are preferred because cyclic anhydride polymer containing blends thereof have more desirable long-term stability.

Thus, in the preferred practice of this invention, the anhydride--bis-oxazoline blend is applied, as a powder, to the substrate to be coated. Then, the powdered-blend coated substrate is heated at an elevated temperature of from about 100° C. to about 250° C., and preferably from about 125° C. to about 175° C., in a first treatment zone to achieved desired melt and flow. After melt and flow, that is, fusion, is achieved, the fused-blend coated substrate is subjected to a second treatment zone containing moisture at similar elevated temperature such as, for example, a high humidity oven, to achieve crosslinking. A smooth, ripple-free coated substrate is thereby obtained.

The hydrocuring reaction, wherein the fused-blend coated substrate is exposed to moisture at elevated temperature to achieve crosslinking, can be carried out with, or without, a catalyst. Suitable catalysts are, for example, p-toluenesulfonic acid, dibutyltin octoate, zinc chloride, hydrogen chloride, and the like. When used, the catalyst will generally be present in an amount of from 0.001% to about 10% by weight based on total amount of reactants, and preferably from about 0.1% to about 1.0% by weight.

The following examples are presented to illustrate but a few embodiments of the invention and are not intended to be limiting in scope.

All parts and percentages throughout this specification and claims are by weight unless otherwise indicated.

In the Examples, the following abbreviations are used:

MMA = methyl methacrylate
BA = butyl acrylate
i-BA = iso-butyl acrylate
S = styrene
MAn = maleic anhydride
AMP = 2-amino-2-methyl-1-propanol The swelling ratio, which is the ratio of the thickness of a film swollen in a solvent, that is, in equilibrium with a solvent, to the thickness of the dry cured film, is obtained by measuring the swollen and dry cured films by means of an Ames Micrometer.

Two types of ovens were used for curing films. The first, a forced draft oven, needs no further description. The convection oven used for curing films in the presence of moisture had a volume of 1200 cubic inches and was vented through a 5 cm. hole in the top. Water was introduced through a teflon needle from a syringe driven by a Phillips and Bird Kymograph. The syringe capacity and Kymograph speed were varied according to the delivery rate desired. The condition referred to as saturated steam was achieved by allowing water to evaporate from 2 round containers 7 cm. in diameter, placed in the bottom of the oven--at 150° water evaporated at the rate of 100 ml./hr. Excellent temperature control of the oven was achieved by using a Matheson Lab-Stat proportioning controller between the heating element and the power source.

The Tukon Hardness Test, which is used to evaluate the hardness of the films in TABLE VI hereinbelow, is a standard method for testing indentation hardness of organic coatings described in the 1974 ANNUAL BOOK OF STANDARDS by the American Society for Testing and Materials 1974 as ASTM D 1474-68 (Reapproved 1973), pp. 226–230.

DESCRIPTION OF THE PREFERRED EMBODIMENTS

EXAMPLE 1

Tetramethylene-2,2'-bis-4,4-dimethyl-2-oxazoline

To a reaction vessel equipped with a stirrer, thermometer, and fractional distillation apparatus is charged 219 g. (1.5 moles) of adipic acid and 400 g. (4.5 moles) of 2-amino-2-methyl-1-propanol (hereinafter referred to as AMP). The resulting mixture is heated to reflux under a nitrogen atmosphere. The reaction temperature gradually increases from 165° C. to 221° C. over a period of 13.5 hours while the water of reaction and excess AMP are removed by fractional distillation. The total distillate removed is 169.5 g., which titrated as 34.1% AMP or 112 g. of water by difference (108 g. water, theory). 439.2 g. of crude reaction product is obtained. 405.6 g. of the crude reaction product is then distilled under reduced pressure to yield 348 g. (92% yield) of pure product, b.p. 126°–136° C./2.5 mm Hg; NE found 126; calculated 126 ($HClO_4$ titration).

EXAMPLE 2

Heptamethylene-2,2'-bis-4,4-dimethyl-2-oxazoline

This poly-oxazoline compound is prepared by the method described in Example 1 except that the reaction vessel is charged with 188 g. (1.0 moles) of azelaic acid and 257 g. (3.0 moles) of AMP. Upon distillation of the crude reaction mixture under reduced pressure, 223.4 g. (76% yield) of pure product is obtained in two fractions, b.p. 161°–165° C./3.3 mm Hg and 165°–173° C./3.3 mm Hg, respectively, (each fraction having an infra red spectrum identical with that of the other); NE found 150, calculated 147 ($HClO_4$ titration).

EXAMPLE 3

Octamethylene-2,2'-bis-4,4-dimethyl-2-oxazoline

This poly-oxazoline compound is prepared by the method described in Example 1 except that the reaction vessel is charged with 818 g. (3.56 moles) of dimethyl sebacate and 758 g. (8.52 moles) of AMP. Upon distillation of the crude reaction mixture under reduced pressure, 854.4 g. (78% yield) of pure product is obtained in two fractions, b.p. 159°–170° C./1.5-2.4 mm Hg and 163°–191° C./1.4-1.6 mm Hg, respectively, (each fraction having an infra red spectrum identical with that of the other); NE found 161, calculated 154 ($HClO_4$ titration).

EXAMPLE 4

1,3-Phenylene-bis-4,4-dimethyl-2-oxazoline

This poly-oxazoline compound is prepared by the method described in Example 1 except that the reaction vessel is charged with 83 g. (0.5 mole) of isophthalic acid and 268 g. (3.0 moles) of AMP. Upon distillation of the crude reaction mixture under reduced pressure, 111 g. (81.5% yield) of pure product is obtained, b.p. 145°–152° C./0.3 mm Hg, m.p. 67°–74° C.; NE found 135.6, calculated 136 ($HClO_4$ titration).

EXAMPLE 5

Tetramethylene-2,2'-bis-5-methyl-2-oxazoline

This poly-oxazoline compound is prepared by the method described in Example 1 except that the reaction vessel is charged with 64.5 g. (0.442 mole) of adipic acid and 100 g. (1.33 moles) of isopropanolamine. The crude product mixture solidifies upon cooling. Upon recrystallizing a portion of this crude solid, a pure crystalline product having a m.p. of 118°–120° is obtained and identified as N,N'-(2-hydroxypropyl) adipamide. A portion of the crude solid product is charged to a distillation vessel and distilled under reduced pressure to give a crude oil in two fractions, b.p 120°–125° C./1.25 mm Hg and 125°–170° C./1.25 mm Hg, respectively. Upon careful redistillation of the crude oil, a low yield of the desired pure bis-oxazoline compound is obtained, b.p. 135°–137° C./2.5 mm Hg.

EXAMPLE 6 poly-[2-(3-butenyl)-4,4-dimethyl-2-oxazoline]

A low molecular weight poly-oxazoline compound is prepared by teating 15.3 g. (0.1 mole) of 2-(3-butenyl)-4,4-dimethyl-2-oxazoline with 0.51 g. of di-t-butyl peroxide at 135° C. Additional portions of 0.23 g. and 0.26 g. of di-t-butyl peroxide are added after 2 and 4 hours of the reaction period. After a total reaction period of 21 hours, volatile by-products and unreacted starting material are removed at 150°–155° C./0.5 mm Hg to yield 10 g. (5.94 meq. of oxazoline per gram) of polymer product.

EXAMPLE 7

The following illustrates the preparation of a coating according to this invention utilizing a solution application method.

A hydrocurable, thermosettable blend is prepared by dissolving 60 g. of copolymer of i-butyl acrylate/maleic anhydride in the ratio of parts by weight of 90/10 (59.3% solids in Solvesso 100/n-butyl acrylate (75/25) solvent system) and 5.59 g. of octamethylene-2,2'-bis-4,4-dimethyl-2-oxazoline. This blend is cast onto a glass plate to provide a 20 mil film and the coated plate is then heated in an oven at 110° for 2 hours in the presence of water which is fed into the oven at the rate of 3 ml./hour. The resulting cured film has a swelling ratio in toluene of 1.6. This increase in film thickness indicates that crosslinking of the film has occurred.

EXAMPLE 8

The following illustrates the preparation of a comparison coating outside the scope of the invention utilizing a solution application method.

Example 7 is repeated except that the film-coated glass plate is heated in an oven at 100° for 2 hours in the absence of added water. The resulting film formed a gelatinous mass in toluene and was only lightly crosslinked.

EXAMPLE 9

The following illustrates the preparation of a coating according to the invention utilizing a solution application method.

A hydrocurable, thermosettable blend is prepared by dissolving 25 g. of a copolymer of methyl methacrylate/butyl acrylate/styrene/maleic anhydride in the ratio of parts by weight of 40/25/20/15 (42% solids in toluene) and 2.39 g. of heptamethylene-2,2'-bis-4,4-dimethyl-2-oxazoline. This blend is cast onto four glass plates to provide a 10 mil film and the coated plates are then heated at 130° C. for 0.5 hour in an oven to which water is fed at varying rates. The swelling ratios in methyl ethyl ketone of the resulting cured films, relative to the amount of water added during cure, and the degree of crosslinking indicated thereby, are presented in TABLE I.

TABLE I

Effect of Water on Cure of Film of Heptamethylene-2,2'-bis-4,4-dimethyl-2-oxazoline with MMA/BA/S/MAn (40/25/20/15) Copolymer

| Water Addition Rate | Swelling Ratio |
|---|---|
| 0 (comparison) | Soluble |
| 3 ml./hour | 3.0 |
| 18 ml./hour | 2.4 |
| Oven saturated with steam | 2.2 |

TABLE I indicates that good cure can be obtained in a short time if water is introduced during the oven baking period and that the greater the concentration of water in the oven during cure, the faster the rate of cure, thereby reducing the possible volatilization of the bis-oxazoline compound and increasing the degree of crosslinking.

EXAMPLE 10

The following illustrates the preparation of a pigmented coating according to the invention utilizing a powder application method.

A hydrocurable, thermosettable blend is prepared by mixing 25 g. of a copolymer of methyl methacrylate/butyl acrylate/styrene/maleic anhydride in the ratio of 40/25/20/15 (42% solids in toluene), 2 g. of octamethylene-2,2'-bis-4,4-dimethyl-2-oxazoline, and 5.56 g. of titanium dioxide. This blend is then dried, ground to a powder, and the powder is spread onto a glass plate. The powder-coated glass plate is then heated in an oven at about 110° C. to effect melt fusion of the blend whereupon the coating flowed out to a film. This film is then cured at about 150° for a period of 0.5 hour in an oven saturated with steam.

EXAMPLE 11

Example 10 is repeated except that the hydrocurable, thermosettable blend is cast onto glass plates to provide a 10 mil film and the coated plates are then dried at 110° C. for a period of 1 hour in a nitrogen atmosphere (that is, in the absence of moisture). A sample of the dried film from one of the glass plates is obtained and tested to determine whether there is any loss of the oxazoline moiety upon heating prior to cure. The sample is titrated and found to contain 0.803 meq./g. of oxazoline (theory 0.880 meq./g.), which results show only a 9% loss of oxazoline. The remainder of the dried film-coated plates are then cured at 150° for about 0.5 hour in an oven saturated with steam.

EXAMPLE 12

The following illustrates the preparation of another coating according to the invention utilizing a solution application method.

A hydrocurable, thermosettable blend is prepared by dissolving 4.34 g. of a solution of 8.08 g. of poly-[2-(3-butenyl)-4,4-dimethyl-2-oxazoline] in 17.16 g. of toluene with 20 g. of a copolymer of methyl methacrylate/styrene/butyl acrylate/maleic anhydride in the ratio of parts by weight of 5/20/60/15 (40% solids in toluene). This blend is cast onto a glass plate to provide a 10 mil film and the coated plate is then cured at 150° C. for 0.5 hour in an oven saturated with steam. The resulting cured film has a swelling ratio in methyl ethyl ketone or toluene of 1.4.

EXAMPLE 13

The following illustrates the preparation of another coating according to the invention utilizing a powder application method.

A hydrocurable, thermosettable blend is prepared by dissolving 10.5 g. of a copolymer of methyl methacrylate/styrene/butylacrylate/maleic anhydride in the ratio of parts by weight of 40/20/25/15 (42% solids in toluene), 2.39 g. of heptamethylene-2,2'-bis-4,4-dimethyl-2-oxazoline, and mixing therein 5.56 g. titanium dioxide. This blend is then devolatilized and ground to a powder. The powdered blend is then spread onto glass plates and the powder-coated plates are exposed to atmospheric moisture at room temperature for varying periods of time. Samples of these coatings are tested after varying intervals of exposure to atmospheric moisture to determine the amount of unhydrolyzed oxazoline remaining. Subsequently, samples obtained after the same varying intervals of room-temperature hydrolysis are cured at 150° for about 0.5 hour in an oven saturated with steam. The results of these preparations are presented in TABLE II.

TABLE II

Effect of Atmospheric Moisture on Rate of Oxazoline Hydrolysis and on Flow of Pigmented Anhydride Copolymer-bis-Oxazoline Powders

| Exposure Time (hours) | Oxazoline Remaining (%) | Flow[a] |
|---|---|---|
| 0 | 88[b] | ok |
| 41 | 30 | ok |
| 92 | 23 | ok |
| 910 | 8 | ok |

[a]Crude flow measurements recorded after baking a thin-layered powder-coated glass plate at 150° C for 0.5 hour in an oven saturated with steam.
[b]An additional 7.5% of the theoretical oxazoline is present as amine.

The results, presented in TABLE II, show that even though the oxazoline group hydrolyzes upon exposure to atmospheric moisture, the curing reaction is sufficiently slow that flow is achieved.

EXAMPLE 14

The following illustrates the preparation of another embodiment of the invention utilizing a solution application method.

A hydrocurable, thermosettable blend is prepared by dissolving a copolymer of methyl methacrylate/styrene/butyl acrylate/maleic anhydride in the ratio of parts by weight of 5/20/60/15 (40% solids in toluene) and octamethylene-2,2'-bis-4,4-dimethyl-2-oxazoline in amounts sufficient to provide a ratio of anhydride:oxazoline groups of 1:1. The resulting blend is cast onto glass plates to provide a thin film and the coated glass plates are then heated at 110° for varying periods of time in both the presence and the absence of water. The properties of the resulting cured films are presented in TABLE III.

TABLE III

Effect of Water on the Cure Rate of a Blend of Octamethylene-2,2'-bis-4,4-dimethyl-2-oxazoline with MMA/S/BA/MAn (5/20/60/15) Copolymer

| Bake Time (Min.) | Water, Rate of Feed to Oven | Swelling Ratio | % Reaction of Basic Nitrogen[a] |
|---|---|---|---|
| 40 | 3 | 2.6 | 58 |
| 60 | 0[b] | — | 13 |
| 120 | 0[c] | 4.6 | 49 |
| 120 | 3 | 2.0 | 75 |
| 240 | 3 | 1.5 | 87 |

[a]The unreacted amine was determined by allowing a fragment the film that is swollen with methyl Cellosolve to react with excess HClO$_4$ for 90 minutes or more; the unreacted HClO$_4$ is determined by titration with NaOAc and the unreacted amine is calculated therefrom.
[b]Moisture is carefully excluded from the baking treatment. Subsequent baking at 150° C for 30 min. in the presence of water effects cure of this film.
[c]No attempt is made to exclude atmospheric moisture from the oven.

EXAMPLE 15

The following illustrates the relationship between the water vapor concentration dependent rate of cure and the loss of oxazoline functionality of the blends of the invention.

A hydrocurable, thermosettable blend is prepared by dissolving a copolymer of methyl methacrylate/styrene/butyl acrylate/maleic anhydride in the ratio of parts by weight of 5/20/60/15 (40% solids in toluene) and octamethylene-2,2'-bis-4,4-dimethyl-2-oxazoline in amounts sufficient to provide anhydride:oxazoline groups in a ratio of 1:1. The resulting blend is cast onto glass plates to provide a thin film and the coated plates are then heated at 150° for 0.5 hour in the presence of varying amounts of water. The results are presented in TABLE IV.

TABLE IV

Loss of Octamethylene-2,2'-bis-4,4-dimethyl-2-oxazoline from a Blend with (MMA/S/BA/MAn) Copolymer (5/20/60/15) as a Function of Water Vapor Concentration in the Curing Oven at 150° C

| Rate of Water Addition to the Oven | Swelling Ratio | % Loss of Oxazoline |
|---|---|---|
| 0 (forced air oven) | 3.8 | 52 |
| 3 ml./hour | 2.6 | 31 |
| saturated with steam | 1.8 | 8 |

The results presented in TABLE IV show that the cure of the blends of the invention is faster in water and that volatilization of bis-oxazoline is minimized and results in more highly crosslinked films. EXAMPLE 16

The following illustrates the relationship between the molecular weight and structure of the bis-oxazolines and the loss thereof due to volatilization from thin films prepared from the blends of the invention during cure of the films.

Hydrocurable, thermosettable blends are prepared by dissolving a maleic anhydride copolymer and various bis-oxazolines in amounts sufficient to provide anhydride: oxazoline groups in a ratio of 1:1. The resulting blends are cast onto glass plates to provide a thin film and the coated plates are then cured by heating at 150° C. for about 0.5 hour in an oven saturated with steam. The results are presented in TABLE V.

TABLE V

Volatility of Various Bis-Oxazolines from Blends with Maleic Anhydride Copolymers Upon Curing[a]

| Bis-Oxazoline | Bake Temp (° C) | Swelling Ratio | % N Found | % N Charged[b] | % Loss of Oxazoline |
|---|---|---|---|---|---|
| 1,3-Phenylene-bis-4,4-dimethyl-2-oxazoline[c] | 150 | 3.0 | 1.23 | 1.77 | 31 |
|  | 170 | 4.3 | 0.27 | 1.77 | 85 |
| Tetramethylene-2,2'-bis-4,4-dimethyl-2-oxazoline[c] | 150 | 2.1 | 1.23 | 1.79 | 31 |
|  | 170 | 3.0 | 0.80 | 1.79 | 55 |
| Heptamethylene-2,2'-bis-4,4-dimethyl-2-oxazoline[d] | 130 | 1.9 | 1.62 | 1.77 | 9 |
|  | 150 | 2.1 | 1.49 | 1.77 | 16 |
| Octamethylene-2,2'-bis-4,4-dimethyl-2-oxazoline[d] | 130 | 1.9 | 1.55 | 1.73 | 10 |
|  | 150 | 1.8 | 1.59 | 1.73 | 8 |
|  | 170 | 1.8 | 1.47 | 1.73 | 15 |

[a]Cured for 0.5 hour in an oven saturated with steam.
[b]Based on 100% solids.
[c]Blend with (MMA/S/BA/MAn) copolymer = (5/20/60/15).
[d]Blend with (MMA/S/BA/MAn) copolymer = (40/20/25/15).

The results presented in TABLE V demonstrate that octamethylene- and heptamethylene-2,2'-bis-4,4-dimethyl-2-oxazoline undergo minimal volatilization under the preferred cure conditions of 150° C. for 0.5 hour in an oven saturated with steam. In the case of tetramethylene-2,2'-bis-4,4-dimethyl-2-oxazoline, appreciable volatilization loss occurs at 150° C. but reasonably good cure is achieved. In contrast, 1,3-phenylene-bis-4,4-dimethyl-2-oxazoline undergoes appreciably volatilization and affords poorer cure, that is, relatively lower degree of crosslinking as evidenced by a greater swelling ratio.

EXAMPLE 17

The following illustrates the effect of typical bis-oxazolines on the hardness of film coatings prepared according to the invention.

Hydrocurable, thermosettable blends are prepared by dispersing a copolymer of methyl methacrylate/styrene/butyl acrylate/maleic anhydride in the ratio of parts by weight of 40/20/25/15 (42% solids in toluene) and typical bis-oxazolines in amounts sufficient to provide anhydride: oxazoline groups in a ratio of 1:1. The resulting blends are cast onto glass plastes to provide a thin film and the coated plates are then cured by heating at 150° C. for about 0.5 hour in an oven saturated with steam. The results are presented in TABLE VI.

TABLE VI

Tukon Hardness[a] of Cured Films[b] Prepared from a Blend of (MMA/S/BA/MAn) Copolymer (40/20/25/15) with bis-Oxazolines

| Oxazoline | Tukon Hardness | Swelling Ratio[c] |
|---|---|---|
| Octamethylene-2,2'-bis-4,4-dimethyl-2-oxazoline | 12.7 | 1.9 |
| Tetramethylene-2,2'-bis-4,4-dimethyl-2-oxazoline | 13.7 | — |
| None | 14.5 | soluble |

[a]ASTM D 1474-68 (Reapproved 1973)
[b]Films cured at 150° C for 0.5 hour in an oven saturated with steam.
[c]Swelling solvent is methyl ethyl ketone.

The data in TABLE VI demonstrate that films prepared from the bis-oxazoline--maleic anhydride blends of the invention are characterized by a decrease in hardness when compared with films prepared from maleic anhydride copolymers alone. This effect may be readily compensated for by selecting a maleic anhydride copolymer having a suitable glass transition temperature to impart any desired degree of hardness to cured films of the invention.

EXAMPLE 18

In order to determine the thermal stability of hydrocurable, thermosettable blends of typical maleic anhydride copolymers and bis-oxazolines, two representative MAn copolymers are blended with octamethylene-2,2'-bis-4,4-dimethyl-2-oxazoline in amounts sufficient to provide a ratio of anhydride:oxazoline groups of 1:1. About 1 ml. of the resulting blends, respectively, are placed in an evacuated sealed tube in the absence of water and heated to about 175° for about 5 hours. The results are presented in TABLE VII.

TABLE VII

Thermal Stability of Solutions of MAn Copolymers and Octamethylene-2,2'-bis-4,4-dimethyl-2-oxazoline[a]

| MAn Copolymer | Anhydride Loss (%) | Oxazoline Loss (%) | Gardner-Holdt Viscosity Before | After |
|---|---|---|---|---|
| i-BA/MAn = 90/10 | 30 | 30 | U | X to Y |
| MMA/S/BA/MAn = 5/20/60/15 | 30 | 15 | A | C |

[a]The samples contained anhydride and oxazoline groups in a ratio of about 1:1 and were heated in sealed tubes to about 175° C for about 5 hours.

The results in TABLE VII show that the viscosity increase in minor despite the rather severe thermal treatment. The loss of anhydride and oxazoline functionality is not fully understood.

We claim:

1. A hydrocured, thermoset polymer comprising the reaction product of:

(A) a first poly-oxazoline compound represented by the formula

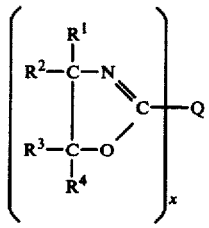

wherein:
(1) Q is a sigma bond or a divalent or trivalent organic radical having up to sixty carbon atoms which is a member of (a) the saturated straight-chain, branched-chain, and mono- and dicyclic aliphatic hydrocarbon group, or (b) the mono- and dicyclic aromatic hydrocarbon group, or (c) the group which comprises a combination of (a) and (b) above, wherein each of said radicals occurs, independently, as a substituent attached to a different carbon atom or to a single carbon atom of the hydrocarbon groups of (a) and (b) above;
(2) x is an integer having a value of from 2 to 20, wherein when Q is a sigma bond, x has a value of 2; and
(3) $R^1$, $R^2$, $R^3$ and $R^4$ are independently selected from the group of hydrogen and monovalent organic radicals which contain from 1 to 20 carbon atoms and which are unreactive towards carboxylic acid cyclic anhydrides; and
(B) A second compound comprising a polymer containing in the backbone thereof from about 2–70% by weight of compounds having units derived from addition polymerizable ethylenically unsaturated dicarboxylic acid cyclic anhydrides; and
(C) Water; wherein said first oxazoline compound and said second cyclic anhydride-containing compound are initially blended in a proportion such that the ratio of poly-oxazoline groups of said first compound to cyclic anhydride groups of said second compound is about 1:1, the blended compounds are heated to a temperature of from about 100° C. to about 250° C. thereby fusing the blended compounds, and said fused blended compounds are exposed to moisture by means of feeding water or steam into a high humidity oven at a temperature of about 110° C. up to 150° C. to effect said reaction, thereby effecting crosslinking of the compounds of the blend.

2. The hydrocured thermoset polymer of claim 1 wherein said second compound is polymerized from a mixture comprising addition polymerizable ethylenically unsaturated dicarboxylic acid cyclic anhydrides selected from the group consisting of maleic, itaconic, and glutaconic anhydrides.

3. The hydrocured thermoset polymer of claim 2 wherein said second compound is polymerized from a monomer mixture comprising from about 2% to 70% by weight of said dicarboxylic acid cyclic anhydrides, the balance of said monomer mixture comprising one or more other ethylenically unsaturated monomers.

4. The hydrocured thermoset polymer of claim 3 wherein said other ethylenically unsaturated monomers are selected from the group consisting of esters of $\alpha,\beta$-ethylenically unsaturated monocarboxylic acids, $\alpha,\beta$-ethylenically unsaturated monocarboxylic acids, $\alpha,\beta$-ethylenically unsaturated aldehydes, esters of $\alpha,\beta$-ethylenically unsaturated dicarboxylic acids, $\alpha,\beta$-ethylenically unsaturated dicarboxylic acids, $\alpha,\beta$-ethylenically unsaturated nitriles, esters of non-conjugated, non-hydroxylated unsaturated fatty acids, hydrocarbons including $\alpha$-olefins and conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), and vinyl ureido monomers.

5. The hydrocured thermoset polymer of claim 4 wherein said other ethylenically unsaturated monomers are selected from the group consisting of esters of $\alpha,\beta$-ethylenically unsaturated monocarboxylic acids and vinylaryl compounds.

6. The hydrocured thermoset polymer of claim 2 wherein said poly-oxazoline compound is selected from the group wherein Q is a divalent saturated straight-chain or branched-chain aliphatic hydrocarbon radial and wherein $R^1$, $R^2$, $R^3$ and $R^4$ are, independently, hydrogen or alkyl having up to 5 carbon atoms.

7. The hydrocured thermoset polymer of claim 6 wherein at least one of $R^1$ and $R^2$ is alkyl having up to 5 carbon atoms and wherein $R^3$ and $R^4$ are hydrogen.

8. The method of claim 5 wherein said thermoset polymer is obtained as a coating of from about 0.5 to about 25 mils in thickness on a solid substrate.

9. The method of claim 8 wherein said blended polymers are applied to said substrate as a powder prior to fusing and curing the coating.

10. An article of manufacture comprising a substrate containing on a surface thereof the hydrocured thermoset polymer of claim 2.

11. An article of manufacture comprising a substrate containing on a surface thereof the thermoset polymer of claim 3.

12. An article of manufacture comprising a substrate containing on a surface thereof the hydrocured thermoset polymer of claim 6.

13. An article of manufacture comprising a substrate containing on a surface thereof the hydrocured thermoset polymer of claim 7.

14. A method of making an article of manufacture comprising the steps of depositing the blend of claim 1 as a powder on a solid substrate; fusing said blend; by heating to a temperature of from about 100° C. to 250° C.; and curing said blend by exposing the fused blend to moisture by means of feeding water or steam into a high humidity oven at a temperature of about 110° C. up to 150° C.

15. A method of making a hydrocured thermoset polymer comprising the steps of blending (A) a first poly-oxazoline compound represented by the formula

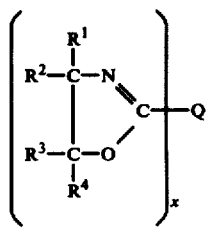

wherein:

(1) Q is a sigma bond or a divalent or trivalent organic radical having up to sixty carbon atoms which is a member of (a) the saturated straight-chain, branched-chain, and mono- and dicyclic aliphatic hydrocarbon group, or (b) the mono- and dicyclic aromatic hydrocarbon group, or (c) the group which comprises a combination of (a) and (b) above, wherein each of said radicals occurs, independently, as a substituent attached to a different carbon atom or to a single carbon atom of the hydrocarbon groups of (a) and (b) above;

(2) $x$ is an integer having a value of from two to twenty, wherein when Q is a sigma bond $x$ has a value of two; and (3) $R^1$, $R^2$, $R^3$ and $R^4$ are independently selected from the groups of hydrogen and monovalent organic radicals which contain from one to twenty carbon atoms and which are unreactive towards carboxylic acid cyclic anhydrides; with (B) a second compound comprising a polymer containing in the backbone thereof from about 2–70% by weight of compounds having units derived from addition polymerizable ethylenically unsaturated dicarboxylic acid cyclic anhydrides;

the ratio of poly-oxazoline groups of said first compound to cyclic anhydride groups of said second compound being about 1:1, heating the blended compounds to a temperature of from about 100° C. to about 250° C. thereby fusing the blended compounds; and curing said fused blend by exposing the fused blend to moisture by means of feeding water or steam into a high humidity oven at a temperature of from about 110° C. up to 150° C. whereby the oxazoline ring, the acid cyclic anhydride, and water undergo react, thereby effecting crosslinking of the compounds of the blend.

* * * * *